United States Patent
Stallfort

[11] Patent Number: 6,164,718
[45] Date of Patent: Dec. 26, 2000

[54] GUIDE LINK FOR SLIDING PANELS IN SLIDE-AND-LIFT SUNROOF CONSTRUCTIONS FOR MOTOR VEHICLES

[75] Inventor: Klaus Stallfort, Maintal, Germany

[73] Assignee: Meritor Automotive GmbH, Frankfurt, Germany

[21] Appl. No.: 09/307,662

[22] Filed: May 10, 1999

[30] Foreign Application Priority Data

May 11, 1998 [DE] Germany .......................... 198 20 699

[51] Int. Cl.⁷ ..................................................... B60J 7/05
[52] U.S. Cl. ........................... 296/222; 296/221; 296/223; 384/42
[58] Field of Search .................... 296/221, 222, 296/223; 384/42

[56] References Cited

FOREIGN PATENT DOCUMENTS

| 3919385 | 7/1990 | Germany | 296/223 |
| 3905985 | 9/1990 | Germany | 296/221 |
| 9116421 U | 12/1992 | Germany | 296/223 |

*Primary Examiner*—Dennis H. Pedder
*Attorney, Agent, or Firm*—Carlson, Gaskey & Old

[57] ABSTRACT

A guide link for a slide-and-lift sunroof construction for motor vehicles has a guide slot area, whose slot width is constricted by a resilient or resiliently supported slot wall so that the guide pin inserted into this slot area is subject to increased, movement-impeding friction in the manner of a friction brake.

18 Claims, 4 Drawing Sheets

GUIDE LINK FOR SLIDING PANELS IN SLIDE-AND-LIFT SUNROOF CONSTRUCTIONS FOR MOTOR VEHICLES

BACKGROUND OF THE INVENTION

The invention concerns a guide link for the displacement of the sliding panel relative to a roof opening in a slide-and-lift roof construction for motor vehicles according to the precharacterizing clause of claim 1.

Guide links of this kind are known in various embodiments and with differently formed guide slots in their end areas (see, e.g. DE-AS 16 05 960, DE 35 29 118 C1, DE 44 05 742 C1). A situation is also known whereby the sliding panel, lowered at the rear edge into sliding position, is prevented by holding-down devices during slide-to-close movements from being displaced upwards at its rear edge under the effect of the drive elements as long as the sliding panel is still situated under the rear solid roof area. These holding-down devices are situated for this purpose between the floor of the guide rail and a flange of the guide rail situated perpendicular to this, the holding-down device being in sliding contact with this flange from below during slide-to-close movements. The holding-down device in constructions of this kind is permanently connected to the sliding panel or to a part permanently attached to the panel. It can be attached directly to the free rear end of the guide link.

In guide links whose rear guide slot areas have a steep upward course, typically in the form of an upward, concave quarter circle, the inserting of the guide pin into this rear guide slot area creates a rapid lowering movement of the guide links on each side and the sliding panel permanently connected to these under the effect of the weight of these parts. This rapid, abrupt lowering movement is completed when panel-side parts participating in the movement meet relatively stationary parts of the slide-and-lift sunroof construction, for example when the holding-down device strikes the floor of the guide rail. This produces a very annoying impact noise which can irritate the vehicle user and suggests malfunction or maladjustment of the slide-and-lift sunroof construction. Padding of the holding-down devices has brought no effective remedy.

This invention prevents these impact noises, or at least reduces them so effectively that they are no longer experienced as irritating.

SUMMARY OF THE INVENTION

According to the basic concept of the invention, the rear guide slot area is at least partially resiliently constricted to a slot width smaller than the diameter of the guide pin, so that, during the lowering movement of the rear edge of the panel, the guide pin, which is received into the rear guide slot area, forms a highly effective friction brake together with the slot walls at the constriction point. In this way, a friction force is generated which is directed as counterforce against the downward force which is dependent on the weight of the elements participating in the lowering movement. The friction brake preferably is on both sides of the panel. With corresponding tuning of this friction brake to the forces induced through the weight, a gentle downward movement of the rear edge of the panel can be achieved, practically without any perceivable contact impact, when, for example, the holding-down device contacts the floor of the guide rail. To achieve the constriction in the rear guide slot area, either the slot wall itself has a resilient configuration or its rear side is supported resiliently.

It is preferred that the resilient constriction of the rear guide slot area includes a relatively thin, flexible slot wall that is biased by a spring element. The recess provided here in the link body and the thin, flexible slot wall can expediently be formed during manufacture of the link body, where the link body is formed from a plastic material during the forming process in which the guide slot is produced. The recess and the spring element preferably are attuned to one another and dimensioned such that the rear side of the thin, flexible slot wall is pressurized extensively and across the required slot constriction area by the inserted spring element.

If the spring element is formed from a rubber elastic material this results in a particularly simple and effective structure of the means of constricting the guide slot. In this case the spring element is manufactured appropriately larger than the recess so that the required prestressing is produced by the compression of the spring element as it is inserted in a positive-locking manner into the recess. In order to enable or make easier the compression of the spring element manufactured from rubber elastic material, it may be equipped with internal cavities, perforations or similar features. The spring element preferably supports itself on all sides against the recess walls, whereby the thin, flexible slot wall undergoes the desired slot-constricting pressurizing.

In a further embodiment of the invention, the spring element is configured as a spiral spring which is inserted into the recess under prestressing. The spiral spring, manufactured for example from spring steel, may be formed in various ways, provided that only one side is in contact extensively and approximately across the desired slot constriction area with the rear side of the thin, flexible slot wall and the other side supports itself against the recess wall distanced from the slot wall. The recess may contain an expedient formed hollow corresponding to the form of the spring-element.

It is sufficient for the resilient constriction of the rear guide slot area if a recess is provided in the link body, defining the thin, flexible slot wall, on one side of the guide slot area only, while the opposite slot wall is a non-elastic component of the link body. However, the arrangement may also be such that there is a recess on both sides of the guide slot in its rear guide slot area, these being led around the end of the guide slot. Here the two opposite slot walls are thin and flexible in the relevant section of the rear guide slot area and pressurized towards one another by the spring elements, or spring element sections in the sense of a guide slot constriction, effective on their rear sides. The recesses or recess sections and spring elements or spring element sections provided on both sides of the rear guide slot area may have the same or different lengths.

In a further embodiment of the invention, the recess or recesses and the spring element or spring elements can be covered by a support plate on both sides so that the spring elements cannot merge from three recesses but also support themselves against the inner surfaces of the support plates. A composite structure of a guide link of this kind is already known and shown in DE 44 05 742 C1.

Further details of the invention are explained below on the basis of the drawings illustrating the preferred embodiments.

DETAILED DESCRIPTION OF THE PREFERRED EMBODIMENT

Figure 1:
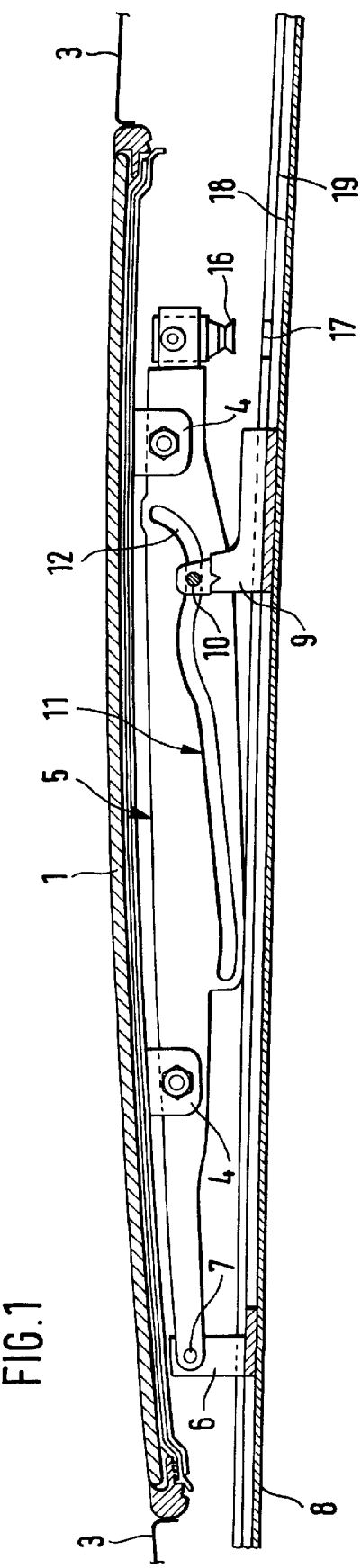
FIG. 1 is a longitudinal section through a slide-and-lift sunroof construction with closed sliding panel.
Figure 2:
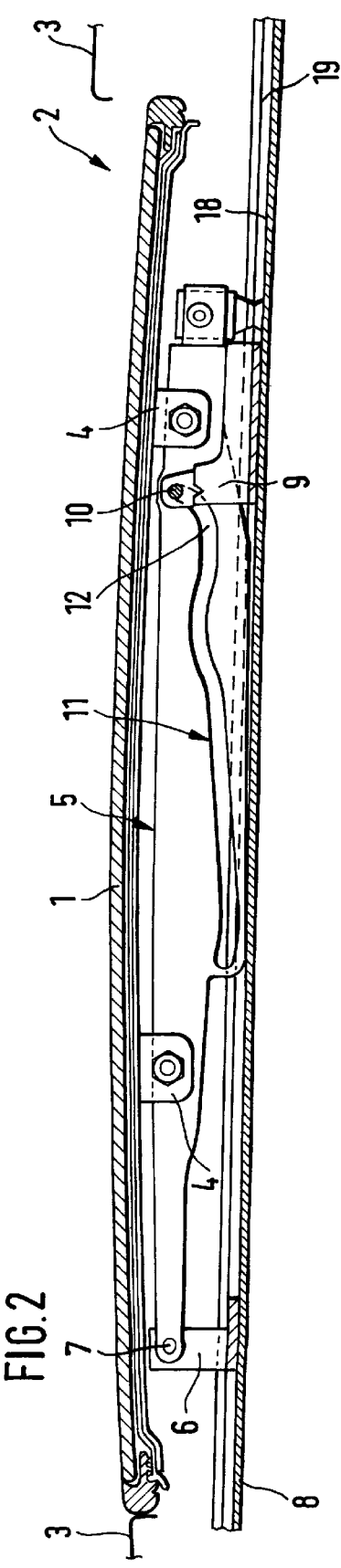
FIG. 2 is a longitudinal section according to FIG. 1 but with sliding panel lowered at its rear edge from the closed position before or at the start of its slide-to-open movement below the rear solid roof area.

The slide-and-lift sunroof construction which can be seen in FIGS. 1 and 2 is equipped, in the illustrated example, with a sliding panel 1 made of glass. Of course, the sliding panel can also be configured as a sheet metal panel. The sliding panel 1 is situated in both figures inside a roof opening 2 which is provided in the metal roof section 3 of a motor vehicle. The sliding panel 1 can be moved in the usual manner from the closed position shown in FIG. 1 so that its rear edge is in the position shown in FIG. 2 and then slide below the rear area of the metal roof section 3.

At both sides (only one is illustrated) of the sliding panel 1, two spaced carrying brackets 4 are attached, to which a long guide link 5 is attached. The guide link 5 projects beyond the front carrying bracket 4 and is connected here in a hinged manner to a front guide shoe 6 by means of a journal 7. On the side of the roof opening opposite the side illustrated, the arrangement is configured in mirror image, the two journals 7 lying on a common horizontal axis which runs in a transverse direction to the direction of the slide axis. For the purposes of simplification, the description here refers only to the arrangement visible in FIGS. 1 and 2 since those skilled in the art understand that the opposite arrangement is configured in mirror image.

The front guide shoe 6 is guided in a sliding manner along a guide rail 8 attached laterally in a roof opening. A rear guide shoe 9 is also guided in a sliding manner along the guide rail 8 at a varying distance from the front guide shoe 6 according to the pivot position of the sliding panel 1. A guide pin 10 is attached to the rear guide shoe 9, this engaging in a sliding manner in a guide slot 11 made in the link body 5.

The guide slot 11 is composed of several connected, differently formed guide slot areas. The guide slot areas control the different movements of the sliding panel according to the relative position of the guide pin in the guide slot and the movement of the guide pin. As can be seen the rear guide slot area 12 has a steep upward course which is associated with the lowering movement of the rear edge of the sliding panel 1 before the start of the slide-to-open movement of the sliding panel or the upward movement of the rear edge of the sliding panel into its closed position on completion of the slide-to-close movement of the sliding panel.

To drive the displacement movements of the sliding panel 1, a drive element, for example in the form of a threaded drive cable (not illustrated) which can be guided in a pressure-resistant and sliding manner along the guide rail engages with the rear guide shoe 9, effecting its sliding movement along the guide rail 8. In FIGS. 1 and 2 not only are the drive elements not illustrated, but, in the interests of restricting the depicted elements to those essential within the context of the invention, further normal structural elements of slide-and-lift sunroof constructions, for example the sliding roof frame which holds the slide-and-lift sunroof construction and is permanently connected to the roof section, the water collecting device assigned to the rear gap between sliding panel and solid roof section, the locking device which prevents displacement of the sliding panel during pivoting movements of the same, the roof interior and, if applicable, panel interior, have also been omitted.

The guide link 5 has a link body 13 which preferably is formed from a metal plate or from a suitable abrasion and pressure-resistant thermoplastic plastic. In the embodiments according to FIGS. 3 to 9, a link body 13 made of plastic is provided with which support plates 14, which are permanently connected to the link body 13 in a sandwich-form composite guide link 5, are in extensive contact on both sides. As can be seen, the guide slot 11 is situated in the link body 13 made of plastic.

The support plates 14 both have a slot which corresponds to the guide slot 11 in the link body 13, but with larger slot width, which is not illustrated in detail in the drawings. The width of this slot in the support plates 14 is dimensioned such that the edge projections 15 surrounding the guide slot 11 of the link body 13 on both sides, projecting outward from the link body 13 and forming a single part with the link body 13, are received in a positive-locking manner. The inner surfaces of the edge projections 15 correspond to the guide paths of the guide slot 11, which practically broadens the guide paths of the edge projections 15 by double the material thickness of the support plates 14. The support plates 14 not only improve the transverse rigidity of the guide link 5 but, through their outer positioning on the edge projections 15, also effectively support the guide slot 11 against forces introduced by the guide pin 10. Otherwise these forces tend to bend the guide slot 11 upwards, i.e., increase the slot width, which could lead to undesirably high guide play.

A holding-down device 16 which projects downwards is attached to the rear end of the guide link 5. When the sliding panel 1 is closed, a through-opening 17 in the upper profile flanges of the guide rail 8 lies opposite the holding-down device 16. When the sliding panel 1, through the insertion of the guide pin 10 into the rear guide slot area 12, is lowered with its rear edge by pivoting around the journal 7 into the position shown in FIG. 2, the holding-down device 16 penetrates downwards through the through-opening 17 and finally meets the floor 18 of the guide rail 8. The measures which are explained in greater detail below serve the purpose of effecting this contact without perceivable impact noise. If the sliding panel, starting from its position shown in FIG. 2 is slid backwards below the solid roof section 3 (slide-to-open), the holding-down device 16 grabs below the flange surface 19 of the guide rail 8 which faces the floor 16. If a slide-to-close movement is made in the opposite direction, the holding-down device 16 and the flange surface 19 ensure that the sliding panel 1, as a result of the engagement between guide pin 10 and the guide slot 11 cannot rise at the rear until the position shown in FIG. 2 has again been reached, in which the holding-down device 16 can move upwards through the through-opening 17 until the closed position shown in FIG. 1 is reached.

Below follows a description based on the embodiments shown in FIGS. 3 to 9 of how the guide slot 11 preferably is constricted in its rear guide slot area 12 across a part section of its course to a slot width which is smaller than the diameter of the guide pin 10. Furthermore, a description is given on how the constriction is formed by at least one resilient or resiliently supported slot wall. First, reference is made to the embodiment according to FIGS. 3 and 4.

In the link body 13, a recess 20 is formed, the course of which approximately follows the rear guide slot area 12. This recess 20 is separated from the guide slot by a thin, flexible slot wall 21. The slot wall is approximately as thick as the edge projections 15, which are components of the slot wall. A spring element 22, pressed against the rear side of the slot wall 21, is inserted into the recess 20, the spring element in this embodiment being formed from a rubber elastic material and being prestressed on insertion into the recess 20. In this way the thin, flexible slot wall 21 is displaced or biased into the slot, thereby constricting the slot width in the area of the rear guide slot area 12 to a dimension which is smaller than the diameter of the guide pin 10.

When the rear edge of the panel is lowered from the position shown in FIG. 1 to the position shown in FIG. 2, or moved in the reverse direction, the guide pin 10 experiences effective friction braking on passing through the rear guide slot area 12. This prevents a hard impact of the holding-down device 16 against the floor 18 of the guide rail 8.

The spring element 22 preferably has a plate form and can be formed from a rubber material with a suitable SHORE hardness. In order to enable or make easier a compression of the spring element on insertion into the recess 20, regular or irregular hollows, for example cavities or foam pores, can be situated in the rubber material.

Figure 3:
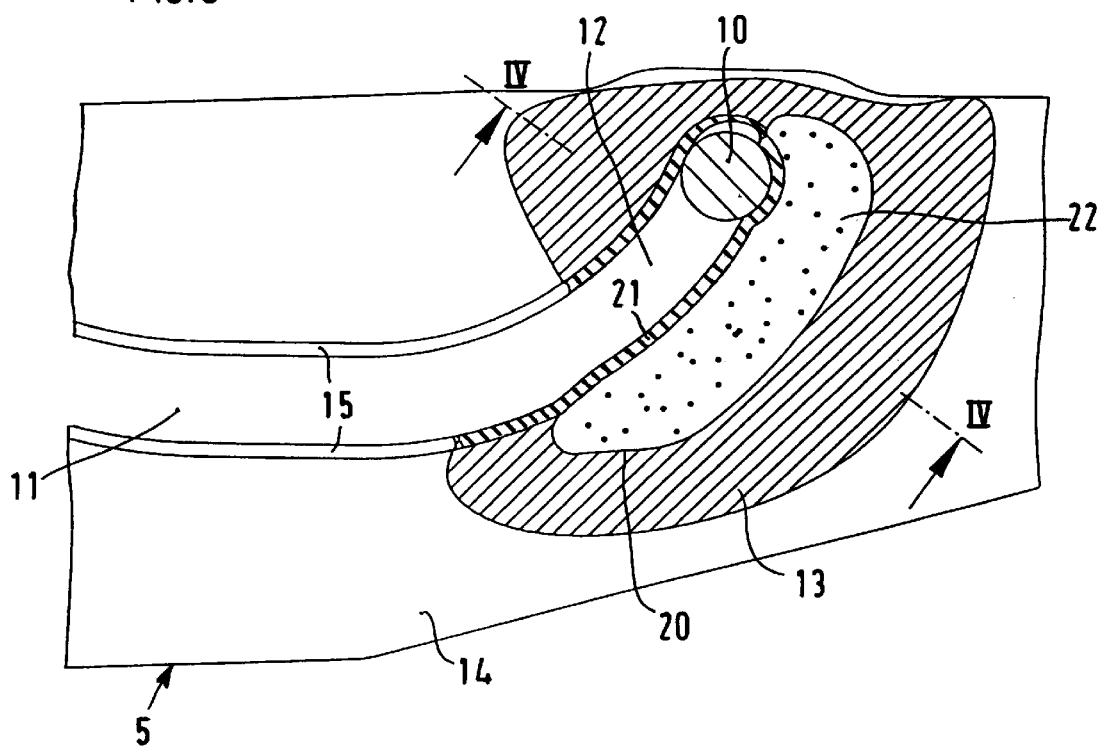
FIG. 3 is a partial and partially cross-sectional side view of a guide link in the rear area which is of interest here and in its relative position to the adjacent guide rail shown in FIG. 2.
Figure 4:
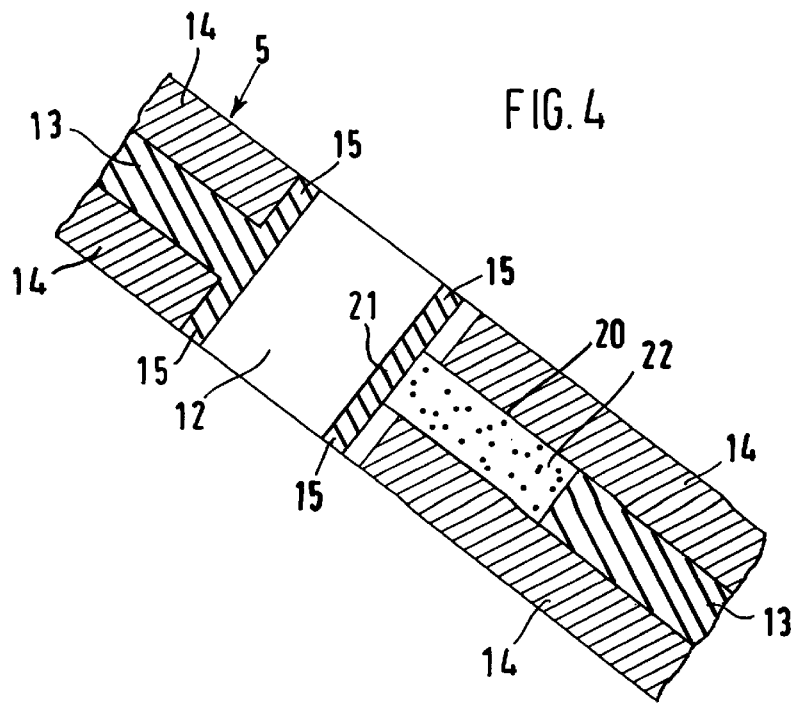
FIG. 4 is a section through the guide link according to Line IV—IV in FIG. 3.

As is shown, furthermore, in FIGS. 3 and 4, the recess 20 and the spring element 22 are covered on both sides by the support plates 14 which lie in extensive contact with the link body 13 and are permanently connected with this in a sandwich construction. The spring element 21 is therefore neither visible from outside nor can it fall out of the recess 20.

Figure 5:
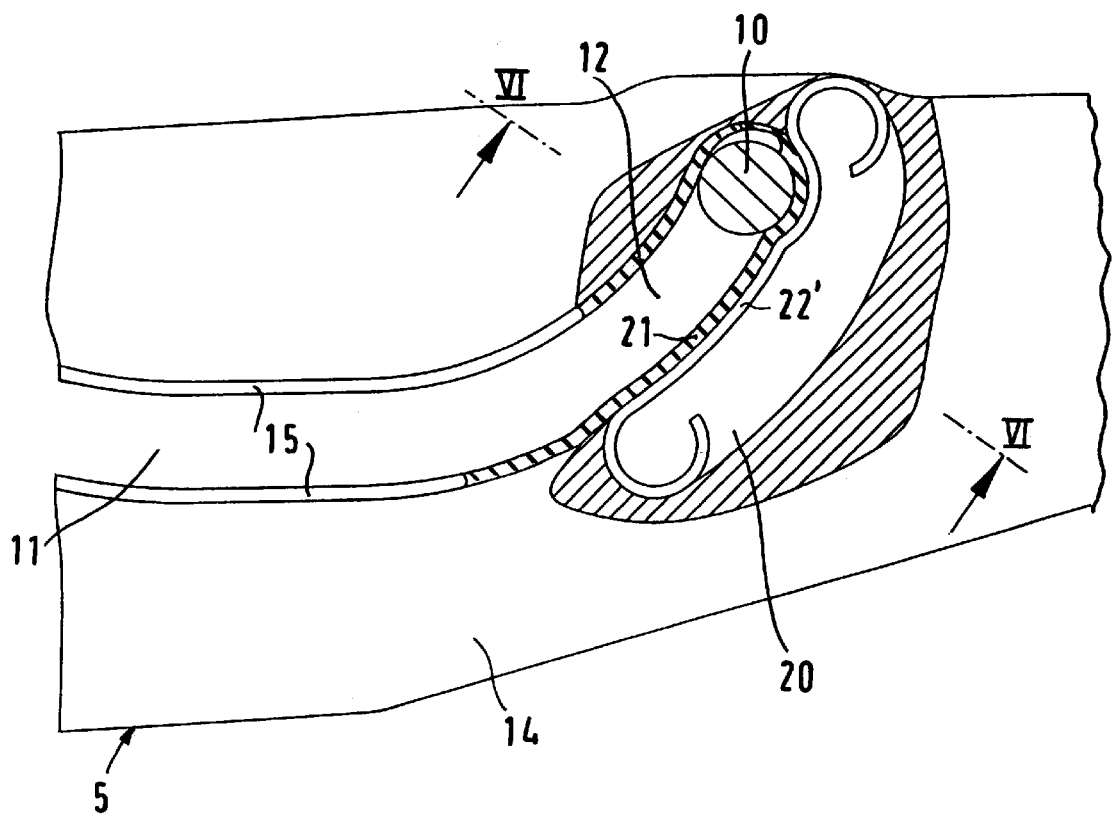
FIG. 5 is a side view of the guide link similar to FIG. 3 with a different configuration of the spring element.
Figure 6:
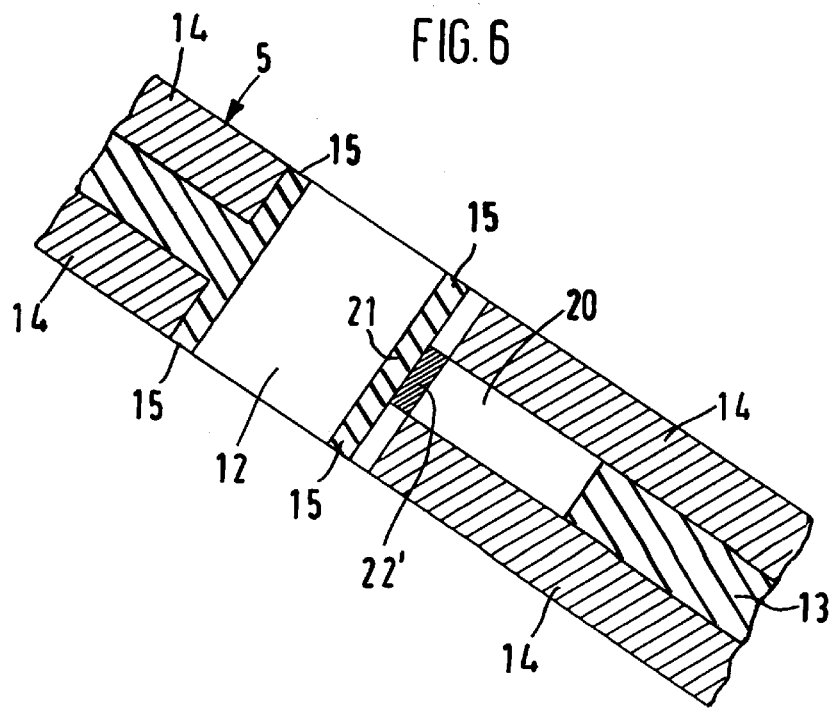
FIG. 6 is a section through the guide link according to Line VI—VI in FIG. 5.
Figure 7:
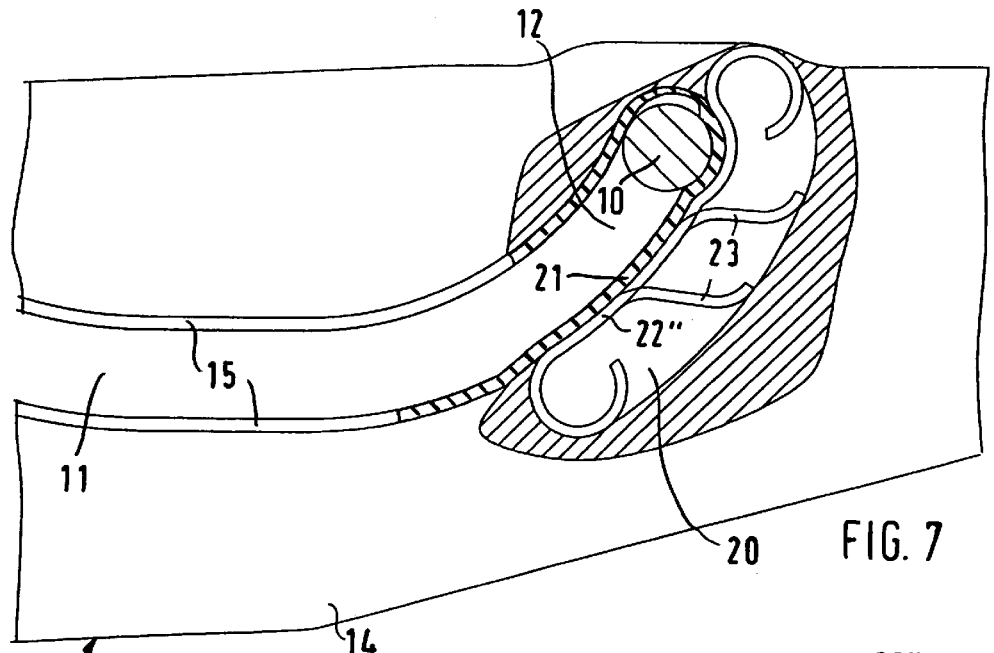
FIG. 7 is a side view of a guide link similar to FIGS. 3 and 5 with a further configuration of the spring element.

The embodiment seen in FIGS. 5 and 6 can essentially be distinguished from those shown in FIGS. 3 and 4 in the fact that a different spring element 22', configured as a bow-shaped spiral spring, is inserted into the recess 20. The spiral spring is set under prestressing on insertion into the recess 20 so that its central area is pressed against the rear side of the slot width in the rear guide slot area 12 described above.

Various forms of spiral spring can be used with the same effectiveness. A further embodiment can be seen in FIG. 7, in which the spring element 22" has approximately the same spiral spring configuration as FIGS. 5 and 6 but several support feet are bent off from the spiral spring, these supporting themselves resiliently against the wall of the recess 20 opposite the slot wall 21.

Figure 8:
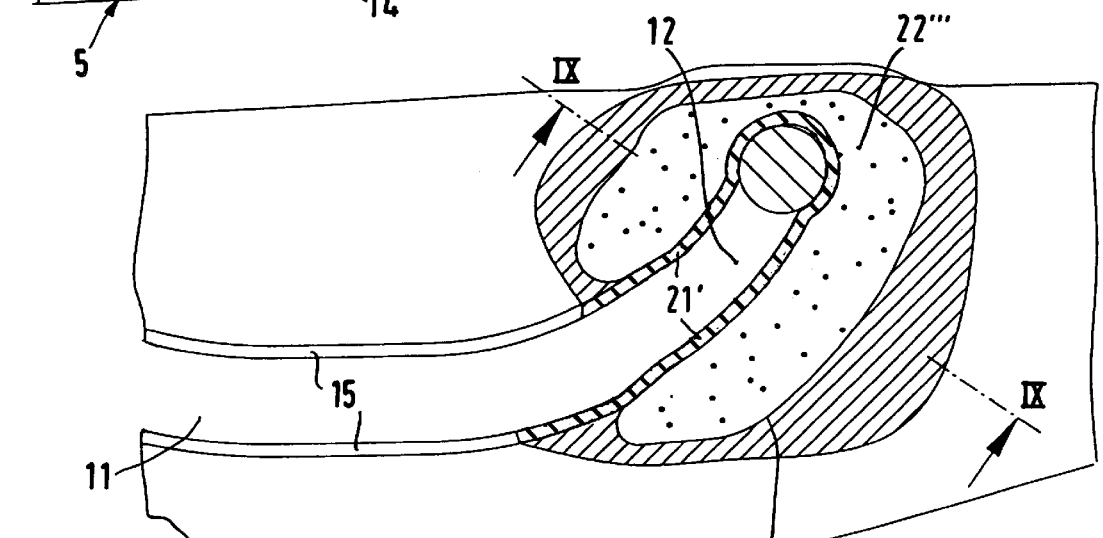
FIG. 8 is a side view of a guide link similar to FIGS. 3, 5 and 7 with a modified configuration of the spring element compared to FIG. 3.
Figure 9:
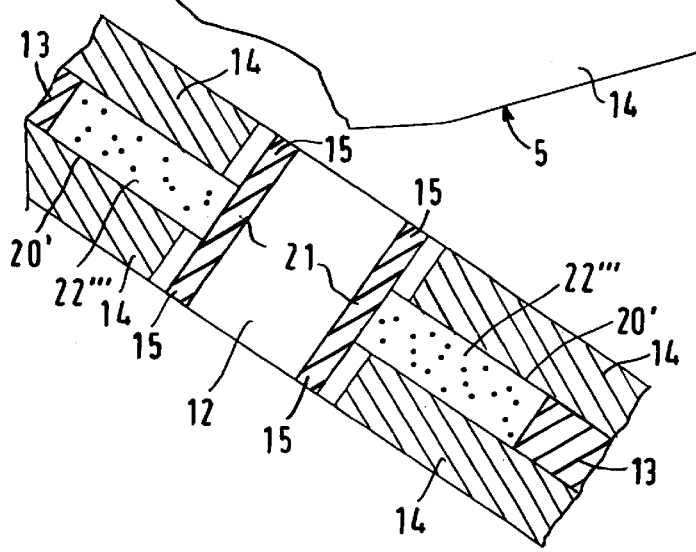
FIG. 9 is a section through the guide link according to Line IX—IX in FIG. 8.

In the embodiment shown in FIGS. 8 and 9, the recess 20' is led around the end of the rear guide slot area 12 and extends on both sides of the guide slot. Accordingly, the spring element 22''' is also led around the end of the rear guide slot area 12, and the thin, flexible slot wall 21' constricts the rear guide slot area 12 on both sides and also encompasses the end of the rear guide slot area 12. In the example illustrated, a spring element 22''' made of rubber elastic material and coordinated to the overall dimensions of the recess 20' is inserted under prestressing into the recess 20'. In this way a spring force acts on the slot wall 21' from both sides of the guide slot, which leads to an effective constriction of the slot width in the rear guide slot area 12. Since the end of the rear guide slot 12 is also constricted by the thin slot wall 21' and is backed with rubber elastic material, the end of the rear guide slot area 12 also acts simultaneously as an end position damper for the guide pin 10.

Above, examples of a guide link for a slide-and-lift sunroof construction for motor vehicles designed according to this invention was described that includes a guide slot area whose slot width is constricted by a resilient or resiliently supported slot wall so that the guide pin inserted into this slot area is subjected to increased movement-impeding friction in the manner of a friction brake. Variations and modifications may become apparent that do not depart from the basis of this invention. The scope of legal protection for this invention can only be determined by studying the following claims.

What is claimed is:

1. Guide link for attaching to a side edge of a sliding panel and for the positioning of the sliding panel relative to a corresponding roof opening in a slide-and-lift sunroof construction for motor vehicles, whose sliding panel is guided by means of front and rear guide shoes along guide rails which are attached laterally in the roof opening, is driven by drive elements which engage with the rear guide shoe and is mounted at its front guide shoes in a hinged manner around a horizontal axis which runs in a transverse direction to the direction of slide, whereby the drive for displacing the sliding panel is transmitted via guide pins attached to the rear guide shoes, these pins engaging in a sliding manner for this purpose in a guide slot formed in a link body consisting of several connected, differently formed guide slot areas, the guide slot areas controlling the different movements of the sliding panel according to the relative position of the guide pin in the guide slot and the movement of the guide pin, whereby the rear guide slot area has a course which slopes steeply upwards, associated with the lowering movement of the rear edge of the sliding panel before the start of the slide-to-open movement of the sliding panel, characterized in that the guide slot is constricted in its rear guide slot area, at least across part of its course, to a slot width smaller than the diameter of the guide pin and that the constriction is formed by at least one of a resilient slot wall and a resiliently supported slot wall.

2. Guide link according to claim 1, characterized in that a recess is formed in the link body, the course of which approximately follows the rear guide slot area, this recess being separated from the guide slot by a thin, flexible slot wall and into which a spring element, pressed against the rear side of the slot wall, is inserted.

3. Guide link according to claim 2, characterized in that the spring element is formed from a rubber elastic material and is prestressed when inserted into the recess.

4. Guide link according to claim 2, characterized in that the spring element is configured as a spiral spring lying against the rear side of the slot wall and prestressed when inserted into the recess.

5. Guide link according to claim 2, characterized in that the recess is led around the end of the rear guide slot area and extends on both sides of the guide slot.

6. Guide link according to claim 2, characterized in that the recess and the spring element are covered on both sides by support plates which lie against the link body and are permanently connected with the link body.

7. A vehicle roof assembly, comprising:

a roof panel that is selectively moveable from a closed position where the panel closes off an opening in a roof of the vehicle and an open position;

a guide member that is supported to move with the roof panel;

a guide slot that receives the guide member to guide the roof panel into and out of the closed position; and wherein the guide slot has a constricting portion that frictionally engages the guide member as the guide member moves through the constricting portion when the panel moves into and out of the closed position.

8. The assembly of claim 7, wherein the constricting portion includes a flexible wall member on at least one side of the guide slot that is biased in a direction toward an inside of the guide slot.

9. The assembly of claim 8, including a biasing member that biases the wall member toward the inside of the guide slot.

10. The assembly of claim 9, wherein the biasing member is made from an elastomeric material.

11. The assembly of claim 10, wherein the flexible wall is on two sides of the guide slot and the elastomeric material has a first portion on one side of the two sides of the guide slot and a second portion on another of the two sides.

12. The assembly of claim 9, wherein the biasing member includes a metallic spring.

13. The assembly of claim 7, wherein the panel has one edge that moves substantially vertically into and out of the closed position and the guide slot constricting portion extends from one end of the guide slot that corresponds to the substantially vertical movement of the panel.

14. The assembly of claim 7, including a body that defines the guide slot and support plates disposed on opposite sides of the body, respectively.

15. The assembly of claim 14, wherein the constricting portion includes a flexible wall member on at least one side of the guide slot that is biased in a direction toward an inside of the guide slot.

16. The assembly of claim 15, including a biasing member that is supported by the body and biases the wall member toward the inside of the guide slot.

17. The assembly of claim 16, wherein the biasing member is made from an elastomeric material and the body includes a recess that receives the biasing member and the support plates operate to maintain the biasing member in a selected position relative to the guide slot.

18. The assembly of claim 16, wherein the biasing member includes a metallic spring supported by the body.

* * * * *